US012643487B2

(12) United States Patent
Suga

(10) Patent No.: US 12,643,487 B2
(45) Date of Patent: Jun. 2, 2026

(54) VEHICLE SIDE PORTION STRUCTURE

(71) Applicant: TOYOTA JIDOSHA KABUSHIKI KAISHA, Toyota Aichi-ken (JP)

(72) Inventor: Koichi Suga, Toyota Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 258 days.

(21) Appl. No.: 18/679,929

(22) Filed: May 31, 2024

(65) Prior Publication Data

US 2025/0003274 A1 Jan. 2, 2025

(30) Foreign Application Priority Data

Jun. 29, 2023 (JP) ................................. 2023-107562

(51) Int. Cl.
| | |
|---|---|
| *B60R 11/04* | (2006.01) |
| *E05D 15/06* | (2006.01) |
| *B60J 5/06* | (2006.01) |
| *E05D 15/10* | (2006.01) |

(52) U.S. Cl.
CPC .......... *B60R 11/04* (2013.01); *E05D 15/0621* (2013.01); *B60J 5/06* (2013.01); *E05D 15/101* (2013.01); *E05Y 2900/531* (2013.01)

(58) Field of Classification Search
CPC ... B60J 5/06; B60R 11/04; B60R 1/26; B60R 1/22; B60R 1/23; B60R 2011/0021; E05D 15/101
USPC ........................................................ 348/148
See application file for complete search history.

(56) References Cited

U.S. PATENT DOCUMENTS

| | | | | |
|---|---|---|---|---|
| 5,906,071 A * | 5/1999 | Buchanan, Jr. | ....... | E05F 15/638 |
| | | | | 49/214 |
| 7,261,364 B2 * | 8/2007 | Tanigawa | ................... | B60J 5/06 |
| | | | | 296/155 |
| 7,669,367 B2 * | 3/2010 | Shimura | ............. | E05D 15/1047 |
| | | | | 49/213 |
| 10,815,704 B2 * | 10/2020 | Toyama | ................. | B60R 11/04 |
| 10,828,970 B2 * | 11/2020 | Richards | ............... | E05F 15/646 |
| 11,057,568 B2 * | 7/2021 | Kobylinski | .............. | B60R 1/25 |
| 11,359,430 B2 * | 6/2022 | Linden | ................... | E05B 83/38 |
| 12,344,081 B2 * | 7/2025 | Lee | ........................ | E05D 15/101 |
| 12,447,929 B2 * | 10/2025 | Özden | .................. | B60S 1/0491 |
| 12,528,424 B2 * | 1/2026 | LaCross | ................. | B60R 11/04 |
| 2005/0044795 A1 * | 3/2005 | Fukushima | ............... | B60J 5/06 |
| | | | | 49/360 |
| 2018/0361931 A1 * | 12/2018 | Ajisaka | .................. | B60R 11/04 |

(Continued)

FOREIGN PATENT DOCUMENTS

| | | | | | |
|---|---|---|---|---|---|
| CN | 109367370 A | * | 2/2019 | ............... | B60J 5/06 |
| CN | 112238821 A | * | 1/2021 | ............... | B60Q 1/38 |

(Continued)

*Primary Examiner* — Jason S Morrow
(74) *Attorney, Agent, or Firm* — Dinsmore & Shohl LLP

(57) ABSTRACT

A vehicle side portion structure includes: a guide groove portion that extends along a vehicle front-rear direction at a side portion of a vehicle body, and that guides a sliding door so as to be capable of sliding; a door side groove portion that is formed at the sliding door, and that extends so as to be continuous with the guide groove portion in the vehicle front-rear direction in a closed state of the sliding door, and a rear camera that is disposed in the door side groove portion, and that is capable of capturing an image of a vehicle rear side.

5 Claims, 3 Drawing Sheets

(56) References Cited

U.S. PATENT DOCUMENTS

| | | | | |
|---|---|---|---|---|
| 2019/0122382 | A1* | 4/2019 | Fan | ..................... G01P 15/0802 |
| 2020/0384923 | A1* | 12/2020 | Sawada | ..................... B60R 1/12 |
| 2023/0193684 | A1* | 6/2023 | Tamura | ................. G06V 40/28 |
| | | | | 701/36 |
| 2024/0083369 | A1* | 3/2024 | Nakayama | .............. B60R 11/04 |
| 2024/0208432 | A1* | 6/2024 | Hoffmann | .............. B60R 11/04 |
| 2024/0375595 | A1* | 11/2024 | Tripp | ..................... H04N 23/90 |
| 2025/0003274 | A1* | 1/2025 | Suga | .................. E05D 15/0621 |
| 2026/0008418 | A1* | 1/2026 | Ikeno | ..................... B60R 11/02 |

FOREIGN PATENT DOCUMENTS

| | | | | | |
|---|---|---|---|---|---|
| CN | 118835898 | A | * | 10/2024 | ............. E05D 13/00 |
| CN | 119218118 | A | * | 12/2024 | ............... B60J 5/06 |
| DE | 102018113236 | B4 | * | 1/2021 | ............. H04N 23/57 |
| EP | 1110781 | A2 | * | 6/2001 | ........ E05D 15/1047 |
| FR | 2961243 | A1 | * | 12/2011 | .......... E05B 17/183 |
| JP | 2005-041240 | A | | 2/2005 | |
| JP | 2013132910 | A | * | 7/2013 | |
| JP | 2019023001 | A | * | 2/2019 | ............. B60R 1/06 |
| JP | 2020192945 | A | * | 12/2020 | ............. H04N 23/51 |
| WO | WO-2007118552 | A1 | * | 10/2007 | ............ B60J 5/0411 |
| WO | WO-2017094704 | A1 | * | 6/2017 | ............... B60R 1/06 |

* cited by examiner

VEHICLE SIDE PORTION STRUCTURE

CROSS-REFERENCE TO RELATED APPLICATION

This application is based on and claims priority under 35 USC 119 from Japanese Patent Application No. 2023-107562 filed on Jun. 29, 2023, the disclosure of which is incorporated by reference herein.

BACKGROUND

Technical Field

The present disclosure relates to a vehicle side portion structure.

Related Art

Japanese Patent Application Laid-Open (JP-A) No. 2005-41240 discloses a structure in which a camera unit is installed at an outer mirror (door mirror) projecting out from a side portion of a vehicle body.

Incidentally, a technique in which an outer mirror is not provided, and images of a vehicle rear side and a side of a vehicle are captured by a camera and displayed inside a vehicle cabin interior is known. However, in a case in which a camera unit projects out from the side of a vehicle body in the same manner as an outer mirror in order to secure a field of view, it is possible that an object might collide with the camera unit, such that a desired image cannot be obtained. There is also a possibility of the design characteristics of the vehicle appearance deteriorating.

SUMMARY

In consideration of the above circumstances, an object of the present disclosure is to provide a vehicle side portion structure that is capable of satisfactorily capturing images of both a vehicle rear side and a side of a vehicle, while ensuring design characteristics.

A vehicle side portion structure according to a first aspect includes: a guide groove portion that extends along a vehicle front-rear direction at a side portion of a vehicle body, and that guides a sliding door so as to be capable of sliding; a door side groove portion that is formed at the sliding door, and that extends so as to be continuous with the guide groove portion in the vehicle front-rear direction in a closed state of the sliding door; and a rear camera that is disposed in the door side groove portion, and that is capable of capturing an image of a vehicle rear side.

In the vehicle side portion structure according to the first aspect, the guide groove portion extends along the vehicle front-rear direction at the side portion of the vehicle body, and the guide groove portion guides the sliding door so as to be capable of sliding. Further, the door side groove portion is formed at the sliding door, and the door side groove portion extends so as to be continuous with the guide groove portion in the vehicle front-rear direction in a closed state of the sliding door. A rear camera that is capable of capturing images of a vehicle rear side is disposed in the door side groove portion. By disposing the rear camera in the door side groove portion in this manner, protrusion of the rear camera from the vehicle body can be suppressed.

Further, since the door side groove portion extends so as to be continuous with the guide groove portion, deterioration in design characteristics can be suppressed compared to a structure in which a dedicated groove for disposing the rear camera is separately provided at a vehicle body side portion.

A vehicle side portion structure according to a second aspect is the vehicle side portion structure according to the first aspect, wherein the guide groove portion extends to a rear end portion of the vehicle body.

In the vehicle side portion structure according to the second aspect, due to the guide groove portion extending to the rear end portion of the vehicle body, the vehicle body does not easily enter the angle of view captured by the rear camera, thereby enabling a wide range of images to be captured at the vehicle rear side.

A vehicle side portion structure according to a third aspect is the vehicle side portion structure according to the first aspect, wherein the guide groove portion is formed on a door belt line.

In the vehicle side portion structure according to the third aspect, due to the guide groove portion being formed on the door belt line, the door belt line and the guide groove portion have a continuous appearance.

A vehicle side portion structure according to a fourth aspect is the vehicle side portion structure according to the first aspect, wherein an entirety of the rear camera is housed inside the door side groove portion.

In the vehicle side portion structure according to the fourth aspect, due to the entirety of rear camera being housed inside the door side groove portion, the rear camera colliding with an object can be effectively suppressed.

A vehicle side portion structure according to a fifth aspect is the vehicle side portion structure according to the first aspect, wherein the door side groove portion is formed at a rear end portion of a rear side door.

In the vehicle side portion structure according to the fifth aspect, the door side groove portion does not interfere with a member configuring the rear side door, such as a side glass.

The vehicle side portion structure according to the present disclosure enables satisfactory capturing of images of the vehicle rear side and the side of the vehicle, while ensuring design characteristics.

BRIEF DESCRIPTION OF THE DRAWINGS

An exemplary embodiment of the present disclosure will be described in detail based on the following figures, wherein.

DETAILED DESCRIPTION

Explanation follows regarding a vehicle V to which a vehicle side portion structure according to an exemplary embodiment has been applied, with reference to the drawings. Note that in each of the drawings, the arrow FR and the arrow UP respectively indicate the vehicle front side and the vehicle upper side. Unless specifically stated otherwise, reference to front and rear, left and right, and up and down directions refers to the front and rear in a vehicle front-rear direction, the left and right in a vehicle width direction, and up and down in a vehicle up-down direction.

Figure 1:
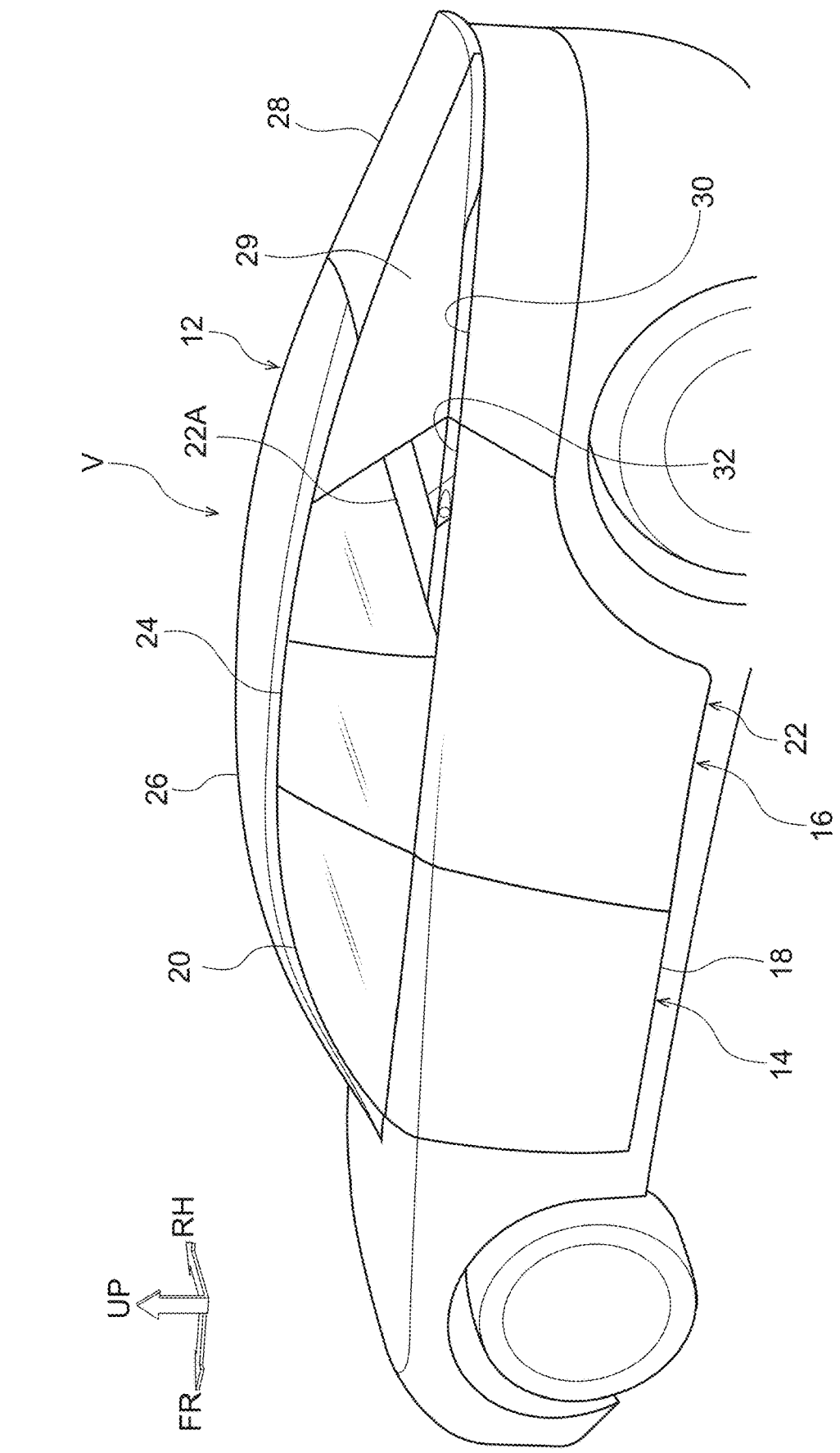
FIG. 1 is a side view of a vehicle to which a vehicle side portion structure according to an exemplary embodiment has been applied.

FIG. 1 is a side view, viewed from the left side, of a vehicle V to which a vehicle side portion structure 22 according to an exemplary embodiment has been applied. As illustrated in FIG. 1, side doors are provided at the front and rear of a vehicle body 12 of the vehicle V.

A front side door 14 at the front side is configured so as to be capable of opening and closing, and partitions a vehicle cabin interior from an exterior of the vehicle cabin. Specifically, a front end portion of the front side door 14 is rotatably attached to the vehicle body 12 by a hinge that is not illustrated in the drawings. Further, front side glass 20 is provided at an upper portion of the front side door 14 so as to be capable of moving up and down.

Figure 2:
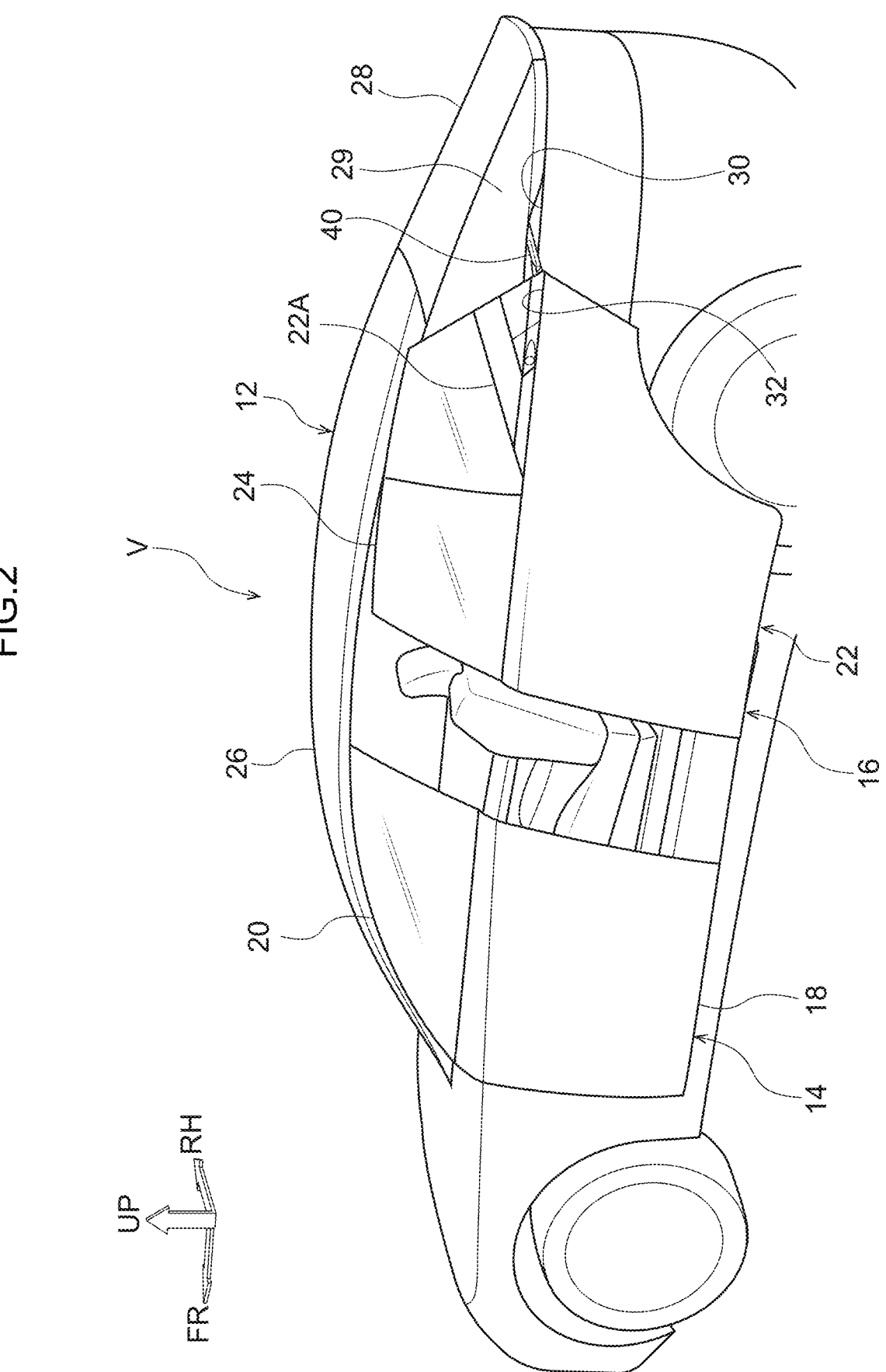
FIG. 2 is a side view illustrating a state during an opening operation of a rear side door, from the state of FIG. 1.

A rear side door 16 is provided at a rear side of the front side door 14. The rear side door 16 is configured so as to be capable of opening and closing, partitions the vehicle cabin interior from the exterior of the vehicle cabin, and rear side glass 24 is provided at an upper portion of the rear side door 16. Note that the rear side door 16 of the present exemplary embodiment is a sliding door that slides in the front-rear direction. Specifically, as illustrated in FIG. 2, the rear side door 16 and a side portion 18 of the vehicle body 12 are coupled by an arm 40, and the rear side door 16 is configured to slide in the front-rear direction due to movement of the arm 40.

The arm 40 is housed inside a guide groove portion 30 that is formed at the side portion 18 of the vehicle body 12, and one end portion of the arm 40 is rotatably attached to the rear side door 16. Anther end portion of the arm 40 is rotatably attached to the vehicle body 12, and the rear side door 16 moves (slides) toward a vehicle rear side along the vehicle body 12 due to the one end portion of the arm 40 opening toward a vehicle width direction outer side and the vehicle rear side from a state in which the one end portion of the arm 40 is housed in the guide groove portion 30.

The guide groove portion 30 is formed at a rear portion of the vehicle body 12 and extends along the vehicle front-rear direction. A roof panel 26 that covers the vehicle cabin from above is disposed at an upper portion of vehicle body 12, and a rear end portion of the roof panel 26 is connected to a rear hood 28. Further, a rear quarter panel 29 is provided at a side portion of the rear hood 28, and the guide groove portion 30 is formed at the rear quarter panel 29.

The guide groove portion 30 is formed on the door belt line, and extends to a rear end portion of the vehicle body 12.

Figure 3:
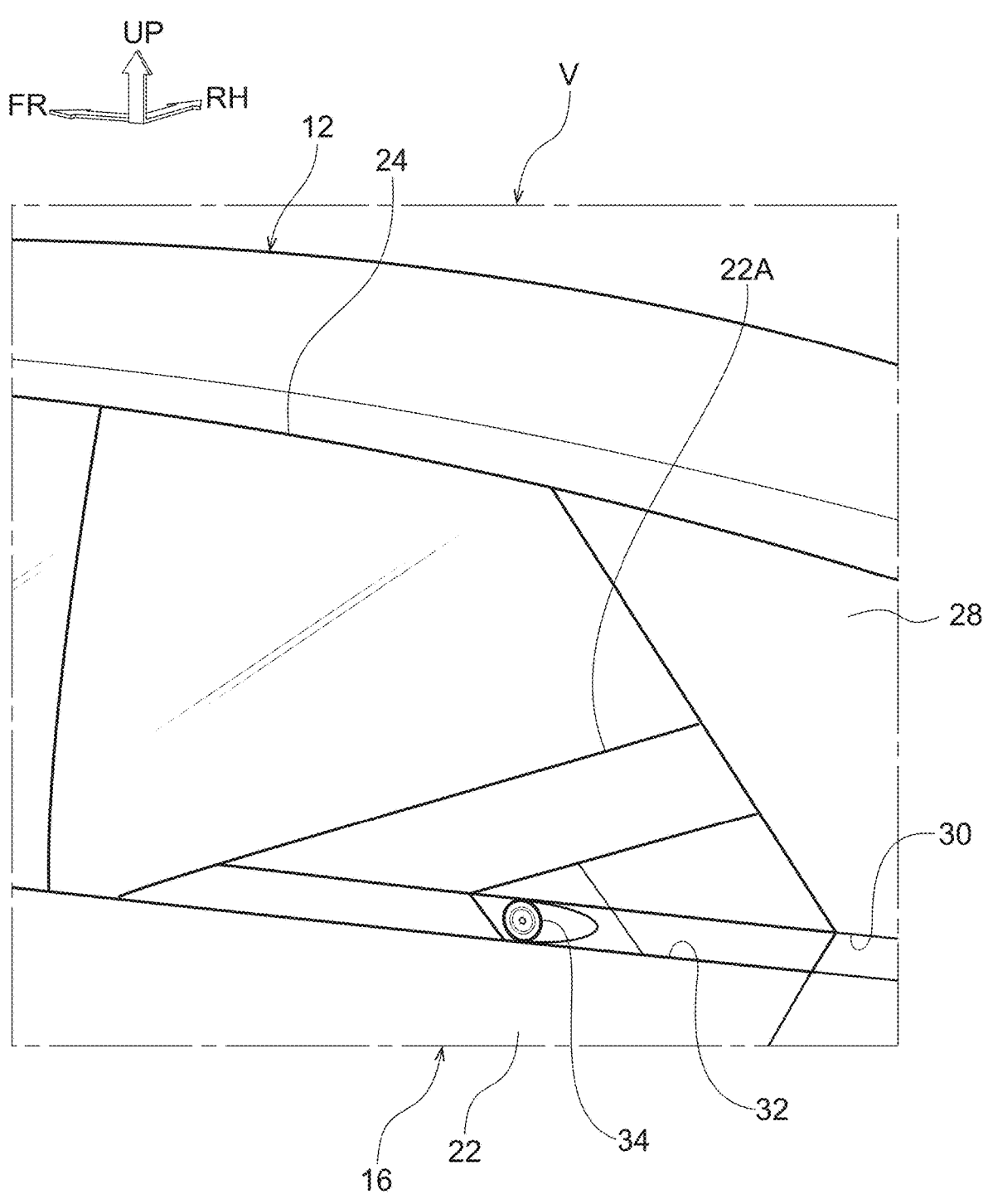
FIG. 3 is an enlarged view of relevant portions in FIG. 1.

As illustrated in FIG. 3, a door side groove portion 32 is formed at the rear side door 16. A substantially triangular extending portion 22A that extends out further upward than the door belt line is provided at the rear side door 16, and the door side groove portion 32 is formed at a lower end of the extending portion 22A.

The door side groove portion 32 is formed at a rear end portion of the rear side door 16 so as to be continuous with the guide groove portion 30 in the vehicle front-rear direction in a closed state of the rear side door 16.

A rear camera 34 that is capable of capturing images of a vehicle rear side is disposed in the door side groove portion 32. The rear camera 34 is an optical camera that is directed toward the vehicle rear side, and the entirety of the rear camera 34 is housed inside the door side groove portion 32. Note that although not illustrated in the drawings, the same configuration is applied to a side portion at a vehicle right side. Namely, a guide groove portion and a door side groove portion, which are bilaterally symmetric with the guide groove portion 30 and the door side groove portion 32, are formed at a right side portion of the vehicle body 12, and a rear camera is disposed in the door side groove portion.

Operation

Next, explanation follows regarding operation of the vehicle side portion structure according to the present exemplary embodiment.

In the vehicle side portion structure 22 according to the present exemplary embodiment, as illustrated in FIG. 1, the guide groove portion 30 extends along the vehicle front-rear direction at the side portion 18 of the vehicle body 12, and the guide groove portion 30 guides the rear side door 16, which is a sliding door, so as to be capable of sliding. Further, the door side groove portion 32 is formed at the rear side door 16, and the door side groove portion 32 extends so as to be continuous with the guide groove portion 30 in the vehicle front-rear direction in a closed state of the rear side door 16. Furthermore, as illustrated in FIG. 3, the rear camera 34, which is capable of capturing images of a vehicle rear side, is disposed in the door side groove portion 32. By disposing the rear camera 34 inside the door side groove portion 32 in this manner, protrusion of the rear camera 34 from the vehicle body 12 can be suppressed.

In particular, in the present exemplary embodiment, due to the entirety of the rear camera 34 being housed inside the door side groove portion 32, the rear camera 34 colliding with an object can be effectively suppressed.

Further, since the door side groove portion 32 of the present exemplary embodiment extends so as to be continuous with the guide groove portion 30, deterioration in design characteristics can be suppressed compared to a structure in which a dedicated groove for disposing a camera at a vehicle body side portion is separately provided. In this manner, the vehicle side portion structure according to the present exemplary embodiment enables satisfactory capturing of images of the vehicle rear side and the side of the vehicle, while ensuring design characteristics.

Further, in the present exemplary embodiment, due to the guide groove portion 30 extending to the rear end portion of the vehicle body 12, the vehicle body 12 does not easily enter the angle of view captured by the rear camera 34, thereby enabling a wide range of images to be captured at the vehicle rear side.

Furthermore, in the present exemplary embodiment, due to the guide groove portion 30 being formed on the door belt line, the door belt line and the guide groove portion 30 have a continuous appearance.

In the present exemplary embodiment, due to the door side groove portion 32 being formed at the rear end portion of the rear side door 16, the door side groove portion 32 does not interfere with other members.

Although the vehicle side portion structure according to the present exemplary embodiment has been explained above, obviously various modes can be implemented within a range that does not depart from the gist of the present disclosure. For example, in the above-described exemplary embodiment, although explanation has been made regarding a case in which the present disclosure is applied to a vehicle V of a sport utility vehicle (SUV) type, the present disclosure is not limited thereto. For example, the present disclosure is widely applicable to vehicles in which a rear side door is a sliding door, such as minivan type vehicles.

Further, in the above-described exemplary embodiment, although the guide groove portion 30 extends to the rear end portion of the vehicle body 12, the present disclosure is not limited thereto. For example, the guide groove portion 30 may be formed only at a front end portion of the rear quarter panel 29.

With regard to the above-described exemplary embodiment, the following additional notes are disclosed.

Additional Note 1

A vehicle side portion structure, including: a guide groove portion that extends along a vehicle front-rear direction at a side portion of a vehicle body, and that guides a sliding door so as to be capable of sliding; a door side groove portion that is formed at the sliding door, and that extends so as to be continuous with the guide groove portion in the vehicle front-rear direction in a closed state of the sliding door; and a rear camera that is disposed in the door side groove portion, and that is capable of capturing an image of a vehicle rear side.

Additional Note 2

The vehicle side portion structure according to Additional Note 1, wherein the guide groove portion extends to a rear end portion of the vehicle body.

Additional Note 3

The vehicle side portion structure according to Additional Note 1 or Additional Note 2, wherein the guide groove portion is formed on a door belt line.

Additional Note 4

The vehicle side portion structure according to any one of Additional Note 1 to Additional Note 3, wherein an entirety of the rear camera is housed inside the door side groove portion.

Additional Note 5

The vehicle side portion structure according to any one of Additional Note 1 to Additional Note 4, wherein the door side groove portion is formed at a rear end portion of a rear side door.

What is claimed is:

1. A vehicle side portion structure, comprising:
   a guide groove portion that extends along a vehicle front-rear direction at a side portion of a vehicle body, and that guides a sliding door so as to be capable of sliding;
   a door side groove portion that is formed at the sliding door, and that extends so as to be continuous with the guide groove portion in the vehicle front-rear direction in a closed state of the sliding door; and
   a rear camera that is disposed in the door side groove portion, and that is capable of capturing an image of a vehicle rear side.

2. The vehicle side portion structure according to claim 1, wherein the guide groove portion extends to a rear end portion of the vehicle body.

3. The vehicle side portion structure according to claim 1, wherein the guide groove portion is formed on a door belt line.

4. The vehicle side portion structure according to claim 1, wherein an entirety of the rear camera is housed inside the door side groove portion.

5. The vehicle side portion structure according to claim 1, wherein the door side groove portion is formed at a rear end portion of a rear side door.

* * * * *